United States Patent
Solomon

(10) Patent No.: US 11,486,787 B2
(45) Date of Patent: Nov. 1, 2022

(54) SYSTEMS AND METHODS FOR MONITORING PRESSURE TRANSIENTS AND PIPE BURSTS

(71) Applicant: Aquarius Spectrum Ltd., Netanya (IL)

(72) Inventor: David Solomon, Netanya (IL)

(73) Assignee: AQUARIUS SPECTRUM LTD., Netanya (IL)

(*) Notice: Subject to any disclaimer, the term of this patent is extended or adjusted under 35 U.S.C. 154(b) by 415 days.

(21) Appl. No.: 16/091,418

(22) PCT Filed: Apr. 4, 2017

(86) PCT No.: PCT/IB2017/051925
§ 371 (c)(1),
(2) Date: Oct. 4, 2018

(87) PCT Pub. No.: WO2017/175136
PCT Pub. Date: Oct. 12, 2017

(65) Prior Publication Data
US 2019/0154538 A1    May 23, 2019

Related U.S. Application Data

(60) Provisional application No. 62/318,221, filed on Apr. 5, 2016.

(51) Int. Cl.
*G01M 3/24*    (2006.01)
*G01M 3/26*    (2006.01)
*G01M 3/00*    (2006.01)

(52) U.S. Cl.
CPC ............. *G01M 3/243* (2013.01); *G01M 3/00* (2013.01); *G01M 3/24* (2013.01); *G01M 3/26* (2013.01)

(58) Field of Classification Search
CPC .......... G01M 3/243; G01M 3/24; G01M 3/26; G01M 3/00; G01M 3/2815
See application file for complete search history.

(56) References Cited

U.S. PATENT DOCUMENTS 3,221,539 A * 12/1965 Evans ................. G01M 3/3263
                                                   73/45.2
3,851,521 A * 12/1974 Ottenstein ............. G01M 3/243
                                                   73/40.5 R
(Continued)

FOREIGN PATENT DOCUMENTS

WO    WO-2014044216 A1 *   3/2014   ............ H04W 4/005

OTHER PUBLICATIONS

International Search Report and Written Opinion dated Jul. 7, 2017 in PCT/IB2017/051925 (6 pgs.).
(Continued)

*Primary Examiner* — Lisa M Caputo
*Assistant Examiner* — Alex T Devito
(74) *Attorney, Agent, or Firm* — Foley & Lardner LLP

(57) ABSTRACT

Systems and methods for monitoring pressure transients and pipe bursts in a pipeline network are provided. The system can include a pressure sensor for measuring pressure in a pipe and generating a pressure signal, and a hydrophone for detecting a change of the pressure and generating a hydrophone signal. The system can include a high pass filter that can filter a portion of the hydrophone signal corresponding to a particular frequency. The system can include a comparator that generates an interrupt signal when the hydrophone signal satisfies a threshold value. The system can include a microcontroller which stays in a sleep mode until receiving the interrupt signal. The microcontroller can switch on the pressure sensor to record the pressure signal generated by the pressure sensor after being woken up.

39 Claims, 6 Drawing Sheets

(56) References Cited

U.S. PATENT DOCUMENTS

| | | | |
|---|---|---|---|
| 3,866,146 A | | 2/1975 | Van Mourik |
| 3,903,729 A | * | 9/1975 | Covington ................ F17D 5/06 |
| | | | 73/40.5 R |
| 4,651,559 A | * | 3/1987 | Horigome ........... G01M 3/2815 |
| | | | 73/40.5 R |
| 6,367,458 B1 | * | 4/2002 | Furusho ............. F02M 25/0809 |
| | | | 123/198 D |
| 7,523,666 B2 | | 4/2009 | Thompson et al. |
| 2006/0101915 A1 | * | 5/2006 | Thompson ............ G01M 3/246 |
| | | | 73/592 |
| 2010/0045471 A1 | | 2/2010 | Meyers |
| 2013/0145826 A1 | | 6/2013 | Richarz et al. |
| 2014/0121999 A1 | | 5/2014 | Bracken et al. |
| 2014/0165731 A1 | | 6/2014 | Linford |
| 2014/0278246 A1 | | 9/2014 | Clark et al. |
| 2014/0281658 A1 | * | 9/2014 | Kelly ....................... G06F 1/10 |
| | | | 713/502 |
| 2015/0102796 A1 | | 4/2015 | Liu et al. |
| 2016/0374021 A1 | | 12/2016 | Alpman et al. |

OTHER PUBLICATIONS

Rashid, S. et al. "A Method for Distributed Pipeline Burst and Leakage Detection in Wireless Sensor Networks Using Transform Analysis." International Journal of Distributed Sensor Networks, vol. 2014, Jul. 22, 2014 (14 pgs.).

"2015 Electronic Newspaper Bound vol. II," edited by the editorial department of Electronic Newspaper, Press of the University of Electronic Science and Technology of China, Nov. 2015, (3 pgs. total).

Office Action dated Dec. 23, 2020 in counterpart Chinese Appl. 201780028330.3 with English-language translation (49 pgs.).

* cited by examiner

SYSTEMS AND METHODS FOR MONITORING PRESSURE TRANSIENTS AND PIPE BURSTS

CROSS-REFERENCE TO RELATED PATENT APPLICATIONS

This application claims priority to and the benefit of U.S. Provisional Application No. 62/318,221, entitled "Pressure Transients and Pipe Burst Monitoring System and Method," filed Apr. 5, 2016, which is incorporated herein by reference in its entirety for all purposes.

BACKGROUND

Town, cities and other municipal areas generally may include some form of pipelined underground networks, such as a water network, and/or a sewer network and the like. Underground modern pipe networks are generally adapted to carry large amount of fluids, i.e., water, to and from various pools, reservoirs, residential and/or commercial facilities, to the extent that societies have become completely dependent on such pipeline networks. Thus, it is important to ensure the proper operation of those pipeline network systems.

SUMMARY

Certain aspects of embodiments disclosed herein by way of example are summarized below. It should be understood that these aspects are presented merely to provide the reader with a brief summary of certain forms a disclosure described and/or claimed herein might take and that these aspects are not intended to limit the scope of any disclosure described and/or claimed herein.

At least one aspect is directed to a system for monitoring pressure transients and pipe bursts in a pipeline network. The system can include a pressure sensor configured to measure pressure in a pipe and to generate a pressure signal. The system can include a hydrophone configured to detect a change of the pressure and to generate a hydrophone signal responsive to the change of the pressure. The system can include a high pass filter configured to receive the hydrophone signal from the hydrophone and to filter a portion of the received hydrophone signal corresponding to a particular frequency. The system can include a comparator configured to receive the hydrophone signal filtered by the high pass filter and to generate an interrupt signal when the hydrophone signal satisfies a threshold value. The system can include a microcontroller configured to stay in a sleep mode until receiving from the comparator the interrupt signal generated according to the hydrophone signal. The microcontroller can start to switch on the pressure sensor to obtain the pressure signal generated by the pressure sensor after being woken up.

In some embodiments, the high pass filter can be configured to filter out frequencies that are below the particular frequency from the hydrophone signal. The frequencies being filtered out are irrelevant to the pressure transients being monitored.

In some embodiments, the microcontroller, after being woken up by the interrupt signal, can start to record the pressure signal generated by the pressor sensor via a first channel and to record the hydrophone signal generated by the hydrophone via a second channel.

In some embodiments, the pressure sensor can be configured to stay in a sleep mode until being woken up by the microcontroller.

In some embodiments, the microcontroller can return to the sleep mode after a predetermined period of time or after completing analyzation of the pressure signal.

In some embodiments, the system can include a non-inverting amplifier and an inverting amplifier configured to process positive and negative pressure transients.

In some embodiments, the system can include a peak detector configured to provide a maximal value of the hydrophone signal to keep the hydrophone signal stable.

In some embodiments, the microcontroller can include at least one analog to digital converter and at least one processing unit.

In some embodiments, the microcontroller can be configured to transmit data based on the pressure signal and the hydrophone signal to a server for analyzation via a computer network.

At least one aspect is directed to a method for monitoring pressure transients and pipe bursts in a pipeline network. The method can include generating a hydrophone signal responsive to a change of pressure in a pipe measured by a hydrophone. The method can include filtering, using a high pass filter, a portion of the hydrophone signal corresponding to a particular frequency. The method can include generating an interrupt signal when the hydrophone signal filtered by the high pass filter satisfies a threshold value. The method can include waking up a microcontroller from a sleep mode responsive to receiving the interrupt signal generated based on the hydrophone signal. The microcontroller can switch on a pressure sensor which measures the pressure in the pipe and generates a pressure signal. The method can include recording the pressure signal generated by the pressure sensor.

At least one aspect is directed to a device for monitoring pressure transients and pipe bursts in a pipeline network. The device can include a pressure sensor configured to measure pressure in a pipe and to generate a pressure signal. The device can include a hydrophone sensor configured to detect a change of the pressure and to generate a hydrophone signal responsive to the change of the pressure. The device can include a high pass filter configured to receive the hydrophone signal from the hydrophone sensor and to filter a portion of the received hydrophone signal corresponding to a particular frequency. The device can include a comparator configured to receive the hydrophone signal filtered by the high pass filter and to generate an interrupt signal when the hydrophone signal satisfies a threshold value. The device can include a microcontroller configured to stay in a sleep mode until receiving from the comparator the interrupt signal generated according to the hydrophone signal. After being woken up, the microcontroller can switch on the pressure sensor to obtain the pressure signal generated by the pressure sensor.

BRIEF DESCRIPTION OF THE DRAWINGS

These and other features, aspects, and advantages of the present disclosure will become better understood when the following detailed description of certain exemplary embodiments is read with reference to the accompanying drawings in which like reference characters represent like parts throughout the drawings.

DETAILED DESCRIPTION

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Pipes can suffer from pressure transients that are caused by sudden changes in flow by valves or pumps. Water transients can be damaging to pipes and can be detected by continuous monitoring of pressure. Pipe burst can also cause pressure transients and is another event that should be monitored. Systems can continuously monitor pressure using pressure sensors and microcontrollers that record pressure in a pipe at a typical rate of, for example, 1000 samples per second. The problem with these systems is that they require relatively high power consumption for battery operation. When the sensors need to be synchronized in time, Global Positioning System (GPS) functionalities may be implemented in each sensor and thus more energy consumption may be required. The systems and methods described herein can reduce power consumption for monitoring of pressure transients and pipe bursts in a pipeline network.

Figure 1:
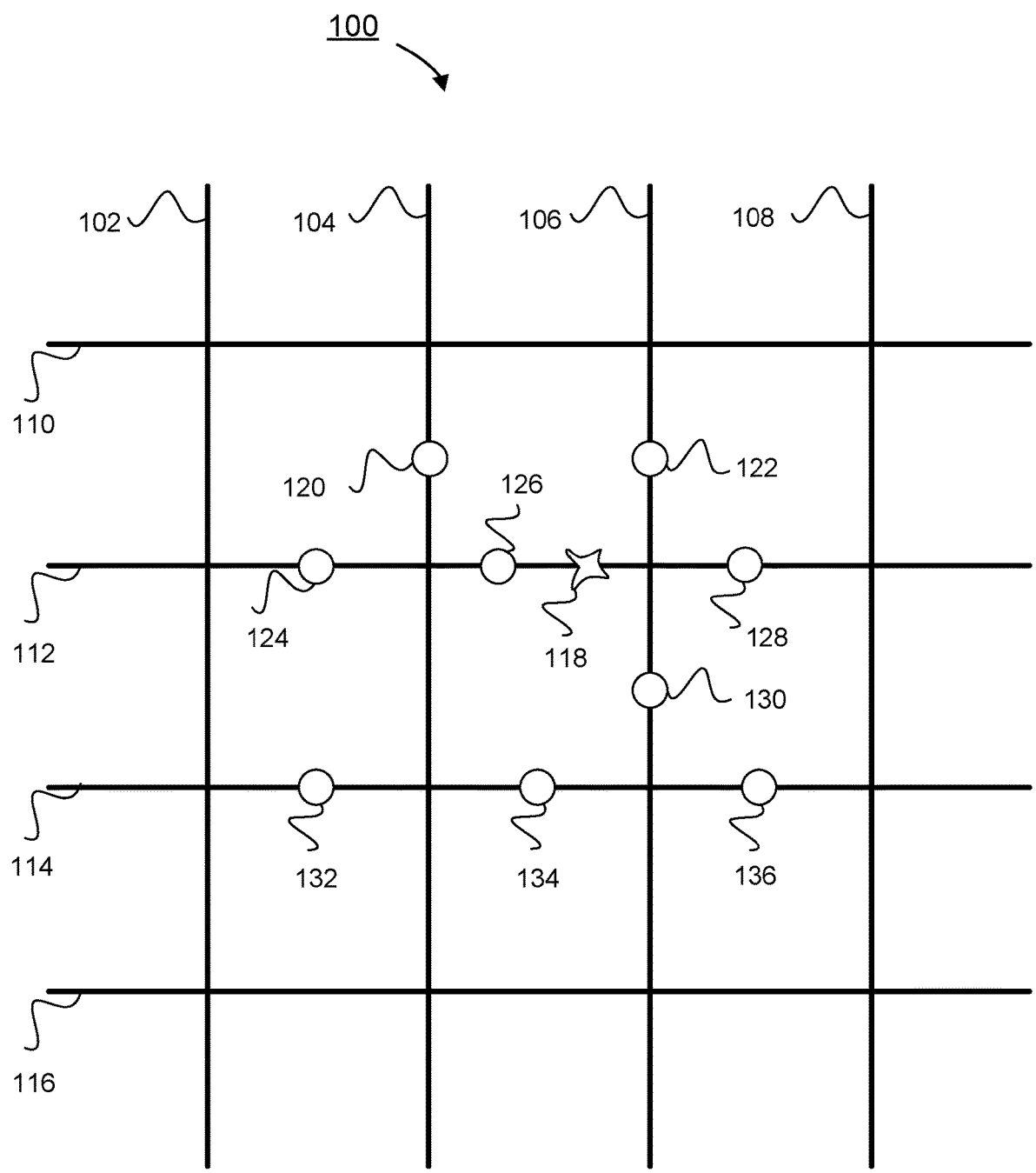
FIG. 1 illustrates an environment for monitoring pressure transients and pipe bursts in a pipeline network, in accordance with an embodiment of the present technique.

FIG. 1 illustrates an environment for monitoring pressure transients and pipe bursts in a pipeline network 100, in accordance with an embodiment of the present technique. The pipeline network 100 is formed of, for example, a grid-like configuration of pipes 102, 104, 106, 108, 110, 112, 114 and 116, all of which are adapted to carry one or more fluids between different points. While the illustrated exemplary network shows a particular type of topology, it should be understood that the present techniques described herein can apply to networks of varying topologies. Further, the pipeline network 100 may be that of a city water system, sewer system or any network of pipes that may be utilized by a city, town or other municipal organization.

In some embodiments, sensors can be placed in various locations along the pipes, such as 120, 122, 124, 126, 128, 130, 132, 134 and 136. Each of these exemplary locations can be used to place the devices and components as described herein to monitor pressure transients and pipe bursts in the pipeline network 100. An event 118, such as a pressure transient, a pipe burst, or a leak, can occur along the pipes in the pipeline network 100. The systems and methods described herein can accurately and timely detect the event 118 with a lower power consumption.

Figure 2:
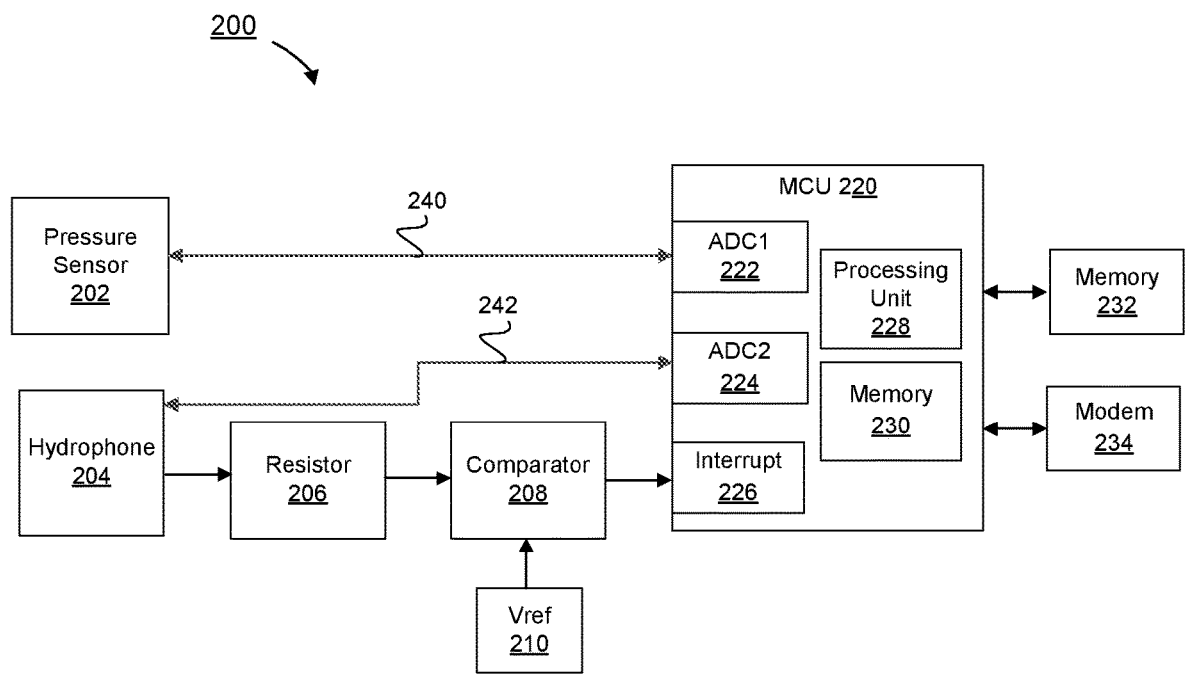
FIG. 2 illustrates a schematic diagram of a system for monitoring pressure transients and pipe bursts in a pipeline network, in accordance with an embodiment of the present technique.

FIG. 2 illustrates a schematic diagram of a system 200 for monitoring pressure transients and pipe bursts in a pipeline network, in accordance with an embodiment of the present technique. The system 200 can include at least a pressure sensor 202, a hydrophone 204, a resistor 206, a comparator 208, a MCU (microcontroller unit) 220, a memory 232 and a modem 234. In some embodiments, the MCU 220 can include at least one analog to digital converter (ADC) (e.g., a first ADC 222 and a second ADC 224), an interrupt unit 226, at least one processing unit 228 and a memory 230. Although FIG. 2 shows example components of system 200, in other embodiments, system 200 can include additional, different, fewer, and/or differently-arranged components than those depicted in FIG. 2.

Figure 3:
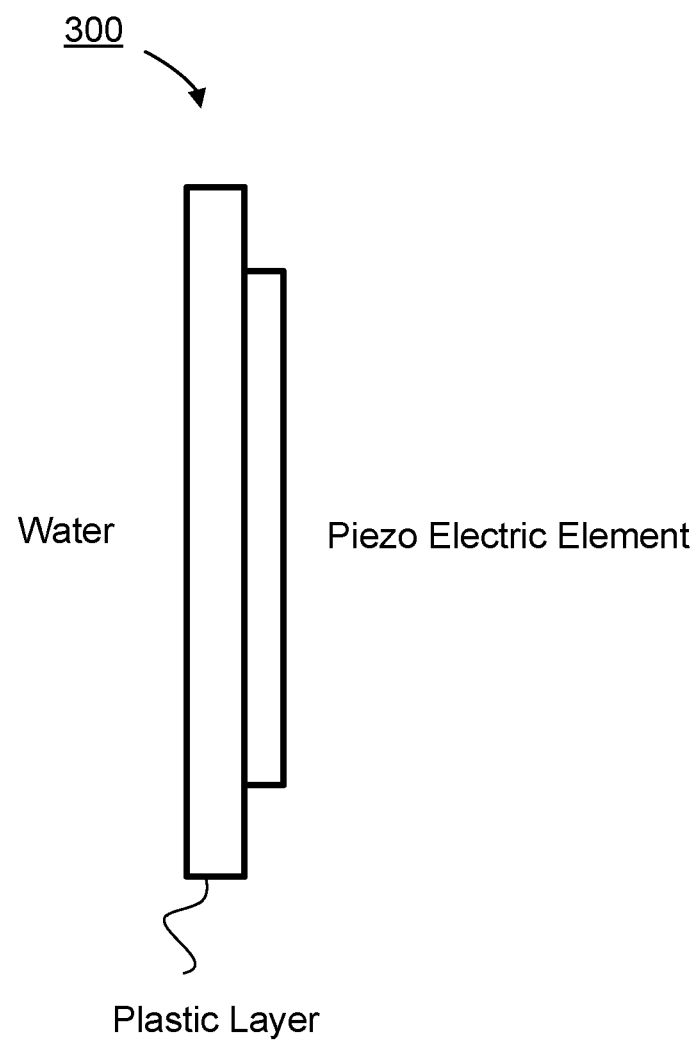
FIG. 3 illustrates a hydrophone, in accordance with an embodiment of the present technique.

In some embodiments, the hydrophone 204 can be configured to detect a change of the pressure in the pipe and to generate a hydrophone signal responsive to the change of the pressure. FIG. 3 illustrates a hydrophone 300, in accordance with an embodiment of the present technique. In some embodiments, the hydrophone 300 can include a flexible element (e.g., a plastic layer) that is subject to liquid (e.g., water) pressure from one side and can include a piezo electric element (e.g., a piezo membrane) on the other side. The piezo electric element or piezo membrane can generate electricity when subjected to a pressure change. The hydrophone 300 is very sensitive to pressure changes and can generate an electric pulse when a pressure transient occurs. While FIG. 3 shows a particular hydrophone, it should be understood that present techniques as described herein can utilize hydrophones of various other types and/or forms. The hydrophone as shown in FIG. 3 is for illustrative purpose only and is not limiting.

Referring again to FIG. 2, in some embodiments, the resistor 206 can be configured to receive the hydrophone signal from the hydrophone 204. In some embodiments, the hydrophone signal generated by the hydrophone 204 is amplified by an amplifier before being sent to the resistor 206. The resistor 206 can provide a high pass filter for the hydrophone sensor 204, for example, typically over 2-10 hertz (Hz) depending on the pipe material. In some embodiments, the high pass filter provided by the resistor 206 can filter a portion of the received hydrophone signal corresponding to a particular frequency. The cut off frequency for filtering the hydrophone signal can be determined such that the frequencies that are irrelevant to the pressure transients being monitored are filtered out. As a result, the high pass filter can filter out the low frequency component of pressure that is not relevant to the dangerous pressure transients. Thus, the systems and methods described herein can provide an accurate triggering mechanism for waking up the MCU 220 as described herein below, because the pressure components that are not relevant to the dangerous pressure transients are being filtered out. The high pass filter can ensure the successful registering of relevant events (e.g., harmful pressure transients) because low frequency signals can be very high in water pipes due to regular activities such as water consumption.

Figure 4:
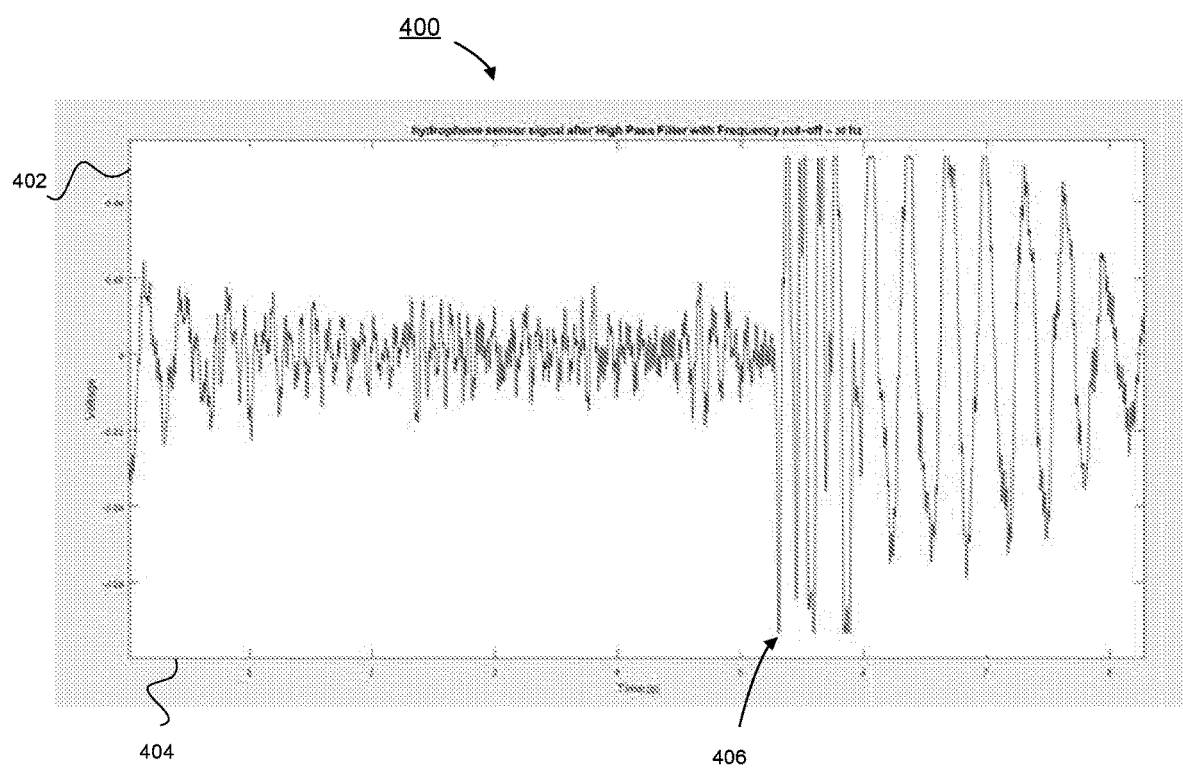
FIG. 4 illustrates a hydrophone signal as recorded with a high pass filter, in accordance with an embodiment of the present technique.

FIG. 4 illustrates a hydrophone signal as recorded with a high pass filter, in accordance with an embodiment of the present technique. The X-axis 404 in FIG. 4 represents time in seconds and the Y-axis 402 represents voltage of the signal. In this example, FIG. 4 shows the hydrophone signal as recorded with the high pass filter second order with a cut-off frequency of 30 Hz. As shown, the transient event 406 occurs at 5.3 second and is characterized by a higher frequency. As can be seen from FIG. 4, the signal is clipped due to dynamic range setting of the recording.

Referring again to FIG. 2, in some embodiments, the comparator 208 can be configured to receive the hydrophone signal after the signal is filtered by the high pass filter and to generate an interrupt signal when the hydrophone signal satisfies a threshold value. The threshold value Vref 210 can be determined based on various conditions of the system. In some embodiments, the threshold value Vref 210 can be determined based on historical or statistical data. In some embodiments, when the filtered hydrophone signal is above the threshold value, an interrupt signal can be generated. The interrupt is transmitted to the MCU 220 to wake up the MCU 220.

In some embodiments, the MCU 220 can be a microcontroller having a clock with ADC capabilities. In the exemplary embodiment of FIG. 2, the MCU 220 includes a first ADC 222, a second ADC 224, an interrupt unit 226, a processing unit 228 and a memory 230. The MCU 220 can also interface to an external memory 232 and a modem 234. In some embodiments, the MCU 220 can have GPS capabilities. Although FIG. 2 shows example components of the MCU 220, in other embodiments, the MCU 220 can include additional, different, fewer, and/or differently-arranged components than those depicted in FIG. 2.

In the systems and methods as described herein, the MCU 220 can stay in a sleep mode unless and until it is woken up by the interrupt signal which is generated when the hydrophone signal is above the threshold value, as described herein above. In some embodiments, the interrupt unit 226 receives the interrupt signal from the comparator 208 and transmits the interrupt signal to the processing unit 228. Responsive to the interrupt signal, the processing unit 228 switches on the pressure sensor 202 to obtain pressure signals. In some embodiments, the pressure sensor 202 can be made of pressure-resistive material that can be "read" by the MCU 220 using an electrical circuit to measure resistivity.

The pressure sensor 202 can be configured to measure pressure in a pipe and to generate a pressure signal. The generated pressure signal can be transmitted to MCU 220 after the MCU 220 is woken up by the interrupt signal. The ADC 222 of the MCU 220 can receive the pressure signal and convert it to a digital signal to be processed by the processing unit 228. In some embodiments, the digitized pressure signal can be stored into the memory 230 or the external memory 232. In some embodiments, the digitized pressure signal can be transmitted to a server via a computer network for further analyzation. For example, the modem 234 or other communication devices can be utilized for transmitting the data to the server via the computer network. In some embodiments, the pressure sensor 202 can be configured to stay in a sleep mode until being woken up by the microcontroller.

In some embodiments, after the MCU 220 is being woken up, the MCU 220 can start to record the pressure signal generated by the pressure sensor 202 via a first channel 240 and to record the hydrophone signal generated by the hydrophone 204 via a second channel 242. In some embodiments, the recording of the pressure signal and the hydrophone signal can occur simultaneously after the MCU 220 is being woken up. The hydrophone signal can be received by the ADC 224 and converted to a digital signal. In some embodiments, the digitized hydrophone signal can be stored into the memory 230 or the external memory 232. In some embodiments, the digitized hydrophone signal can be transmitted together with the pressure signal to the server via a computer network for further analyzation. Thus, according to the present disclosure, the hydrophone signal generated by the hydrophone 204 can be used both as an interrupt to wake up the MCU 220 when the MCU 220 is in sleep mode and can be used to detect leaks when the MCU 220 is woken up and in working mode. Furthermore, the present systems and methods can detect both pressure transients using the signals generated by the pressure sensor 202 and leaks using the signals generated by the hydrophone sensor 204.

In some embodiments, the MCU 220 can return to the sleep mode after a predetermined period of time or after completing analyzation of the pressure signal. For example, the MCU 220 can return to sleep mode after a time period that is determined to be sufficient to record the pressure signals for detecting pressure transients. For instance, the MCU 220 can return to sleep mode after sufficient data is gathered and transmitted to the server. In some embodiments, the MCU 220 can return to sleep mode after the server acknowledges that enough data is received.

The systems and methods described herein can achieve significant power saving than conventional systems. In a monitoring state, the MCU 220 is in a power economic sleep mode. In some embodiments, the only circuits in the system that receive power in the monitoring state are the high pass filter 206, the comparator 208 and the Vref 210 as in the example of FIG. 2. The MCU 220 is in a sleep mode and all other circuits are in a disable mode or with power switched off in the monitoring state. In some embodiments, for example, the power consumption is in the order of 10 Micro Amps for the MCU 220 in sleep mode and 3 Micro Amps for the comparator 208 in the monitoring state.

While the present systems and methods can achieve significant power saving, the present systems and methods can also automatically, effectively, and timely detecting pressure transients. Harmful pressure transient from valve closing typically has a positive (high pressure) peak, followed by pressure oscillations that depend on the elastic properties of the pipes. In some embodiments, the transient pulse can trigger the MCU 220 to start recording the signals of the hydrophone 204 and the pressure sensor 202, as well as setting the time stamp of the interrupt. The trigger provided by the hydrophone 204 can be very fast relative to the pressure transient. In some embodiments, typical recording of the pressure transient signals can be a few seconds at a sample rate of 1K Hz. As described herein above, the data can be stored into a memory and/or can be transmitted to a server for further analyzation.

Figure 5:
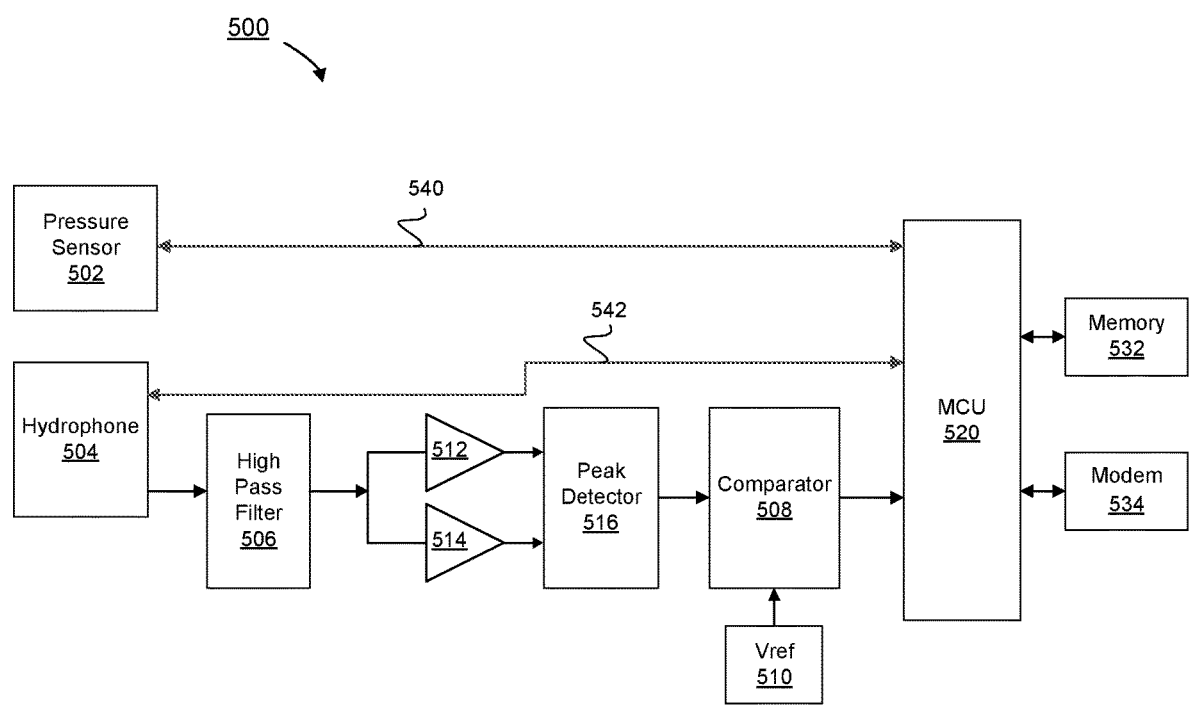
FIG. 5 illustrates a schematic diagram of a system for monitoring pressure transients and pipe bursts in a pipeline network, in accordance with an embodiment of the present technique.

FIG. 5 illustrates a schematic diagram of a system for monitoring pressure transients and pipe bursts in a pipeline network, in accordance with an embodiment of the present technique. The embodiment of FIG. 5 provides an alternative electric schema for the hydrophone interrupt mechanism. Referring to FIG. 5, the pressure sensor 502, the hydrophone 504, the high pass or band pass filter 506, the comparator 508, the Vref 510, the MCU 520, the memory 532, the modem 534, the first channel 540, and the second channel 542 are similar to the pressure sensor 202, the hydrophone 204, the resistor (high pass filter) 206, the comparator 208, the Vref 210, the MCU 220, the memory 232, the modem 234, the first channel 240, and the second channel 242 in FIG. 2, respectively, and will not be described again. Although the MCU 520 does not show components in FIG. 5, it should be understood that the MCU 520 can include similar components as those in MCU 220 in FIG. 2 and perform similar functions.

As shown in FIG. 5, the alternative embodiment includes additional components such as the amplifier (non-inverting amplifier) 512, the inverting amplifier 514, and the peak detector 516. In some embodiments, the pressure transients can be negative pressure transients. The embodiment in FIG. 5 can allow both positive pressure transients and negative pressure transients to trigger the interrupt to wake up the MCU 520. For example, when the hydrophone signal is −0.1 volt, the inverting amplifier 514 can operate to output a positive value. In some embodiments, the outputs of the amplifier 512 and the inverting amplifier 514 are fed into the peak detector 516. The peak detector 516 can provide a maximal value of the signal and keep the signal stable. In some embodiments, the signal after the peak detector 516 is fed into that comparator 508 that triggers the interrupt for the MCU 520 when the absolute amplitude of the positive or negative signal is above the threshold Vref 510.

In some embodiments, The MCU 220, 520 can be configured to analyze the pressure signal and the hydrophone signal, and transmit the data according to oscillations intensity or duration. As described herein above, the data can be transmitted to a server via a computer network for further analyzation. The server can determine the location of the transients by calculating from time delays when the transient pressure pulse reaches each sensor. In some embodiments, the MCU 220, 520 can have GPS capabilities such that time synchronization can be done after the MCU is woken up by the interrupt. The GPS capabilities of the MCU 220, 520 can enable exact time base between sensors to synchronize the signals from several sensors and calculate the time delay for the pulse in each sensor. Thus, in some embodiments, on a system level, the sensors that are triggered by pulse transients can record the pressure and hydrophone signals, synchronize time and send data to a server for analyzation. The server can analyze the data from different sensors, classify the events and locate the transient source using, for example, time of arrival algorithms for correlation.

Figure 6:
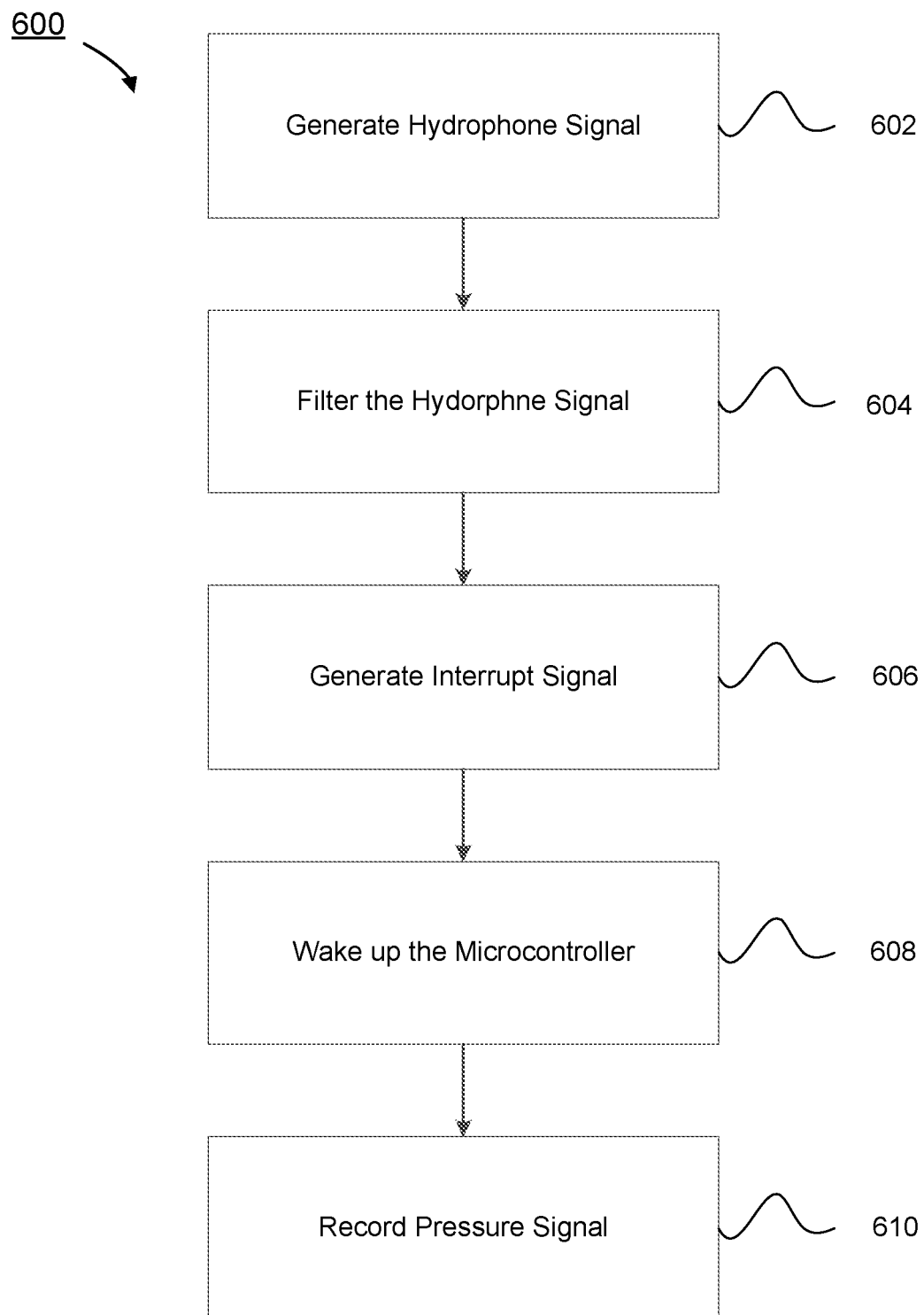
FIG. 6 illustrates a flow diagram of an example method for monitoring pressure transients and pipe bursts in a pipeline network, in accordance with an embodiment of the present technique.

FIG. 6 illustrates a flow diagram of an example method 600 for monitoring pressure transients and pipe bursts in a pipeline network, in accordance with an embodiment of the present technique. In some embodiments, the method 600 can include generating a hydrophone signal (step 602). For example, the hydrophone 204, 504 can be configured to detect a change of the pressure in a pipe and generate a hydrophone signal responsive to the change of the pressure. The method 600 can include filtering a portion of the hydrophone signal (step 604). For example, the high pass filter 206, 506 can filter a portion of the received hydrophone signal corresponding to a particular frequency. In some embodiments, the high pass filter 206, 506 filters out frequencies that are below the particular frequency from the hydrophone signal. The frequencies being filtered out are those that are not relevant to the pressure transients being monitored.

The method 600 can include generating an interrupt signal (step 606). For example, the comparator 208, 508 can be configured to receive the hydrophone signal after the signal is filtered by the high pass filter and generate an interrupt signal when the hydrophone signal satisfies a threshold value. The method 600 can include waking up the microcontroller (step 608). For example, the MCU 220, 520 can be woken up by the interrupt signal generated based on the hydrophone signal generated by the hydrophone 204, 504. The MCU 220, 520 can switch on the pressure sensor 202, 502 after the MCU 220, 520 being woken up from the sleep mode.

The method 600 can include recording the pressure signal (step 610). For example, the pressure sensor 202, 502 can be configured to measure the pressure in a pipe and generate a pressure signal. In some embodiments, the pressure sensor 202, 502 is configured to stay in a sleep mode until being woken up by the microcontroller. In some embodiments, the microcontroller, after being woken up, can record the pressure signal generated by the pressor sensor via a first channel and record the hydrophone signal generated by the hydrophone via a second channel.

In some embodiments, a device for monitoring pressure transients and pipe bursts in a pipeline network can include a pressure sensor configured to measure pressure in a pipe and to generate a pressure signal. The device can include a hydrophone sensor configured to detect a change of the pressure and to generate a hydrophone signal responsive to the change of the pressure. The device can include a high pass filter configured to receive the hydrophone signal from the hydrophone sensor and to filter a portion of the received hydrophone signal corresponding to a particular frequency. The device can include a comparator configured to receive the hydrophone signal filtered by the high pass filter and to generate an interrupt signal when the hydrophone signal satisfies a threshold value. The device can include a microcontroller configured to stay in a sleep mode until receiving from the comparator the interrupt signal generated according to the hydrophone signal. After being woken up, the microcontroller can switch on the pressure sensor to obtain the pressure signal generated by the pressure sensor.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is to cover all modifications, equivalents, and alternatives falling within the spirit and scope of the present disclosure as defined by the following appended claims.

The construction and arrangement of the elements as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. The elements and assemblies may be constructed from any of a wide variety of materials that provide sufficient strength or durability, in any of a wide variety of colors, textures, and combinations. Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

What is claimed is:

1. A system for monitoring pressure transients and pipe bursts in a pipeline network, the system comprising:
   a pressure sensor configured to measure pressure in a pipe and to generate a pressure signal;
   a hydrophone configured to continuously measure and detect a change of the pressure and to generate a hydrophone signal responsive to the change of the pressure;
   a high pass filter configured to receive the hydrophone signal from the hydrophone and to filter a portion of the received hydrophone signal corresponding to a particular frequency, said particular frequency being associated with the pressure transients;
   a comparator configured to receive the hydrophone signal filtered by the high pass filter and to generate an interrupt signal when the filtered hydrophone signal satisfies a threshold value; and
   a microcontroller configured to
      stay in a sleep mode until receiving from the comparator the interrupt signal generated according to the filtered hydrophone signal,
      start to switch on the pressure sensor to obtain the pressure signal generated by the pressure sensor after being woken up,
      set a time stamp of an interrupt triggered by the interrupt signal, and record pressure transient signals associated with the time stamp,
      transmit the recorded pressure transient signals to a server for analyzation via a computer network,
      receive from the server an acknowledgement that sufficient data for analyzation has been received, and
      responsive to receiving the acknowledgement, return to the sleep mode.

2. The system of claim 1, wherein the high pass filter is configured to filter out frequencies that are below the particular frequency from the hydrophone signal, wherein the frequencies being filtered out are irrelevant to the pressure transients being monitored.

3. The system of claim 1, wherein the microcontroller, after being woken up by the interrupt signal, starts to record the pressure signal generated by the pressure sensor via a first channel and to record the hydrophone signal generated by the hydrophone via a second channel.

4. The system of claim 1, wherein the pressure sensor is configured to stay in the sleep mode until being woken up by the microcontroller.

5. The system of claim 1, wherein the microcontroller returns to the sleep mode after a predetermined period of time or after completing analyzation of the pressure signal.

6. The system of claim 1, further comprising a non-inverting amplifier and an inverting amplifier configured to process positive and negative pressure transients.

7. The system of claim 1, further comprising a peak detector configured to provide a maximal value of the hydrophone signal to keep the hydrophone signal stable.

8. The system of claim 1, wherein the microcontroller includes at least one analog to digital converter and at least one processing unit.

9. The system of claim 1, wherein the microcontroller is configured to transmit data based on the pressure signal and the hydrophone signal to the server for analyzation via a computer network.

10. A method for monitoring pressure transients and pipe bursts in a pipeline network, the method comprising:
   measuring, by a pressure sensor, pressure in a pipe to generate a pressure signal;
   generating a hydrophone signal responsive to a change of pressure in a pipe continuously measured and detected by a hydrophone;
   filtering, using a high pass filter, a portion of the hydrophone signal corresponding to a particular frequency, said particular frequency being associated with the pressure transients;
   generating, by a comparator, an interrupt signal when the hydrophone signal filtered by the high pass filter satisfies a threshold value;
   causing a microcontroller to stay in a sleep mode until receiving from the comparator the interrupt signal generated according to the filtered hydrophone signal;
   causing the microcontroller to start to switch on the pressure sensor to obtain the pressure signal generated by the pressure sensor after being woken up;
   setting, by the microcontroller, a time stamp of an interrupt triggered by the interrupt signal, and recording a pressure transient signals associated with the time stamp;
   transmitting, by the microcontroller, the recorded pressure transient signals to a server for analyzation via a computer network;
   receiving from the server an acknowledgement that sufficient data for analyzation has been received; and
   responsive to receiving the acknowledgement, returning to the sleep mode.

11. The method of claim 10, wherein the high pass filter filters out frequencies that are below the particular frequency from the hydrophone signal, wherein the frequencies being filtered out are irrelevant to the pressure transients being monitored.

12. The method of claim 10, further comprising:
   recording, by the microcontroller after being woken by the interrupt signal, the pressure signal generated by the pressure sensor via a first channel and the hydrophone signal generated by the hydrophone via a second channel.

13. The method of claim 10, wherein the pressure sensor stays in the sleep mode until being woken up by the microcontroller.

14. The method of claim 10, further comprising:
   providing, by a peak detector, a maximal value of the hydrophone signal to keep the hydrophone signal stable.

15. The method of claim 10, wherein the microcontroller returns to the sleep mode after a predetermined period of time or after completing analyzation of the pressure signal.

16. The method of claim 10, wherein the microcontroller includes at least one analog to digital converter and at least one processing unit.

17. The method of claim 10, further comprising:
   transmitting data based on the pressure signal and the hydrophone signal to the server for analyzation via a computer network.

18. A device for monitoring pressure transients and pipe bursts in a pipeline network, the device comprising:
   a pressure sensor configured to measure pressure in a pipe and to generate a pressure signal;

a hydrophone sensor configured to continuously measure and detect a change of the pressure and to generate a hydrophone signal responsive to the change of the pressure;

a high pass filter configured to receive the hydrophone signal from the hydrophone sensor and to filter a portion of the received hydrophone signal corresponding to a particular frequency, said particular frequency being associated with the pressure transients;

a comparator configured to receive the hydrophone signal filtered by the high pass filter and to generate an interrupt signal when the filtered hydrophone signal satisfies a threshold value; and a microcontroller configured to
- stay in a sleep mode until receiving from the comparator the interrupt signal generated according to the filtered hydrophone signal,
- start to switch on the pressure sensor to obtain the pressure signal generated by the pressure sensor after being woken up,
- set a time stamp of an interrupt triggered by the interrupt signal, record pressure transient signals associated with the time stamp,
- transmit the recorded pressure transient signals to a server for analyzation via a computer network,
- receive from the server an acknowledgement that sufficient data for analyzation has been received, and
- responsive to receiving the acknowledgement, return to the sleep mode.

19. The device of claim 18, wherein the high pass filter is configured to filter out frequencies that are below the particular frequency from the hydrophone signal, wherein the frequencies being filtered out are irrelevant to the pressure transients being monitored.

20. The device of claim 18, wherein the microcontroller, after being woken up by the interrupt signal, starts to record the pressure signal generated by the pressure sensor via a first channel and to record the hydrophone signal generated by the hydrophone via a second channel.

21. A system for monitoring pressure transients and pipe bursts in a pipeline network, the system comprising:

a pressure sensor configured to measure pressure in a pipe and to generate a pressure signal;

a hydrophone configured to detect a change of the pressure and to generate a hydrophone signal responsive to the change of the pressure;

a high pass filter configured to receive the hydrophone signal from the hydrophone and to filter a portion of the received hydrophone signal corresponding to a particular frequency;

a non-inverting amplifier configured to receive a hydrophone signal filtered by the high pass filter and to output a positive voltage signal when the hydrophone signal filtered by the high pass filter is a positive voltage signal;

an inverting amplifier configured to receive the hydrophone signal filtered by the high pass filter and to output a positive voltage signal when the hydrophone signal filtered by the high pass filter is a negative voltage signal;

a comparator configured to receive an amplifier output signal output from at least one of the non-inverting amplifier or the inverting amplifier and to generate an interrupt signal when the amplifier output signal satisfies a threshold value; and a microcontroller configured to
- stay in a sleep mode until receiving from the comparator the interrupt signal generated according to the amplifier output signal,
- start to switch on the pressure sensor to obtain the pressure signal generated by the pressure sensor after being woken up,
- set a time stamp of an interrupt triggered by the interrupt signal, and record pressure transient signals associated with the time stamp,
- transmit the recorded pressure transient signals to a server for analyzation via a computer network,
- receive from the server an acknowledgement that sufficient data for analyzation has been received, and
- responsive to receiving the acknowledgement, return to the sleep mode.

22. The system of claim 21, wherein the high pass filter is configured to filter out frequencies that are below the particular frequency from the hydrophone signal, wherein the frequencies being filtered out are irrelevant to the pressure transients being monitored.

23. The system of claim 21, wherein the microcontroller, after being woken up by the interrupt signal, starts to record the pressure signal generated by the pressure sensor via a first channel and to record the hydrophone signal generated by the hydrophone via a second channel.

24. The system of claim 21, wherein the pressure sensor is configured to stay in the sleep mode until being woken up by the microcontroller.

25. The system of claim 21, wherein the microcontroller returns to the sleep mode after a predetermined period of time or after completing analyzation of the pressure signal.

26. The system of claim 21, further comprising a peak detector configured to provide a maximal value of the hydrophone signal to keep the hydrophone signal stable.

27. The system of claim 21, wherein the microcontroller includes at least one analog to digital converter and at least one processing unit.

28. The system of claim 21, wherein the microcontroller is configured to transmit data based on the pressure signal and the hydrophone signal to a server for analyzation via a computer network.

29. A method for monitoring pressure transients and pipe bursts in a pipeline network, the method comprising:

generating a hydrophone signal responsive to a change of pressure in a pipe measured by a hydrophone;

filtering, using a high pass filter, a portion of the hydrophone signal corresponding to a particular frequency;

receiving, by a non-inverting amplifier, a hydrophone signal filtered by the high pass filter and outputting a positive voltage signal when the hydrophone signal filtered by the high pass filter is a positive voltage signal;

receiving, by an inverting amplifier, the hydrophone signal filtered by the high pass filter and outputting a positive voltage signal when the hydrophone signal filtered by the high pass filter is a negative voltage signal;

generating an interrupt signal when an amplifier output signal output from at least one of the non-inverting amplifier or the inverting amplifier satisfies a threshold value;

waking up a microcontroller from a sleep mode responsive to receiving the interrupt signal generated based on the amplifier output signal, wherein the microcontroller switches on a pressure sensor which measures the pressure in the pipe and generates a pressure signal;

setting a time stamp of an interrupt triggered by the interrupt signal, and recording the pressure signal generated by the pressure sensor and associated with the time stamp;

transmitting the recorded pressure signal to a server for analyzation via a computer network;

receiving from the server an acknowledgement that sufficient data for analyzation has been received; and responsive to receiving the acknowledgement, returning to the sleep mode.

30. The method of claim 29, wherein the high pass filter filters out frequencies that are below the particular frequency from the hydrophone signal, wherein the frequencies being filtered out are irrelevant to the pressure transients being monitored.

31. The method of claim 29, further comprising:

recording, by the microcontroller after being woken by the interrupt signal, the pressure signal generated by the pressure sensor via a first channel and the hydrophone signal generated by the hydrophone via a second channel.

32. The method of claim 29, wherein the pressure sensor stays in the sleep mode until being woken up by the microcontroller.

33. The method of claim 29, further comprising:

providing, by a peak detector, a maximal value of the hydrophone signal to keep the hydrophone signal stable.

34. The method of claim 29, wherein the microcontroller returns to the sleep mode after a predetermined period of time or after completing analyzation of the pressure signal.

35. The method of claim 29, wherein the microcontroller includes at least one analog to digital converter and at least one processing unit.

36. The method of claim 29, further comprising:

transmitting data based on the pressure signal and the hydrophone signal to a server for analyzation via a computer network.

37. A device for monitoring pressure transients and pipe bursts in a pipeline network, the device comprising:

a pressure sensor configured to measure pressure in a pipe and to generate a pressure signal;

a hydrophone sensor configured to detect a change of the pressure and to generate a hydrophone signal responsive to the change of the pressure;

a high pass filter configured to receive the hydrophone signal from the hydrophone sensor and to filter a portion of the received hydrophone signal corresponding to a particular frequency;

a non-inverting amplifier configured to receive a hydrophone signal filtered by the high pass filter and to output a positive voltage signal when the hydrophone signal filtered by the high pass filter is a positive voltage signal;

an inverting amplifier configured to receive the hydrophone signal filtered by the high pass filter and to output a positive voltage signal when the hydrophone signal filtered by the high pass filter is a negative voltage signal;

a comparator configured to receive an amplifier output signal output from at least one of the non-inverting amplifier or the inverting amplifier and to generate an interrupt signal when the amplifier output signal satisfies a threshold value; and a microcontroller configured to stay in a sleep mode until receiving from the comparator the interrupt signal generated according to the amplifier output signal, start to switch on the pressure sensor to obtain the pressure signal generated by the pressure sensor after being woken up, set a time stamp of an interrupt triggered by the interrupt signal, and record pressure transient signals associated with the time stamp, transmit the recorded pressure transient signals to a server for analyzation via a computer network, receive from the server an acknowledgement that sufficient data for analyzation has been received, and responsive to receiving the acknowledgement, return to the sleep mode.

38. The device of claim 37, wherein the high pass filter is configured to filter out frequencies that are below the particular frequency from the hydrophone signal, wherein the frequencies being filtered out are irrelevant to the pressure transients being monitored.

39. The device of claim 37, wherein the microcontroller, after being woken up by the interrupt signal, starts to record the pressure signal generated by the pressure sensor via a first channel and to record the hydrophone signal generated by the hydrophone via a second channel.

* * * * *